(12) United States Patent
Bagshaw (10) Patent No.: US 7,499,545 B1
(45) Date of Patent: Mar. 3, 2009

(54) METHOD AND SYSTEM FOR DUAL LINK COMMUNICATIONS ENCRYPTION

(75) Inventor: Stephen A. Bagshaw, Thornhill (CA)

(73) Assignee: ATI Technologies, Inc., Toronto, Ontario (CA)

( * ) Notice: Subject to any disclaimer, the term of this patent is extended or adjusted under 35 U.S.C. 154(b) by 1526 days.

(21) Appl. No.: 09/777,032

(22) Filed: Feb. 5, 2001

(51) Int. Cl.
*H04N 7/167* (2006.01)
*H04N 7/16* (2006.01)

(52) U.S. Cl. .......................... 380/212; 725/31

(58) Field of Classification Search ............. 380/33, 380/34, 44, 46, 212; 725/31
See application file for complete search history.

(56) References Cited

U.S. PATENT DOCUMENTS

| | | | | |
|---|---|---|---|---|
| 4,332,464 A * | 6/1982 | Bartulis et al. | ............. | 399/14 |
| 4,389,671 A * | 6/1983 | Posner et al. | ............. | 380/235 |
| 4,613,901 A * | 9/1986 | Gilhousen et al. | ........... | 380/239 |
| 5,091,936 A * | 2/1992 | Katznelson et al. | ......... | 380/237 |
| 6,052,466 A * | 4/2000 | Wright | ............. | 380/262 |
| 6,069,956 A * | 5/2000 | Kurihara | ............. | 380/212 |
| 6,157,719 A * | 12/2000 | Wasilewski et al. | ......... | 380/210 |
| 6,507,346 B1* | 1/2003 | Otera | ............. | 345/606 |
| 6,597,402 B1* | 7/2003 | Butler et al. | ............. | 348/447 |
| 6,996,236 B1* | 2/2006 | England et al. | ............. | 380/213 |
| 7,023,992 B1* | 4/2006 | Kubota et al. | ............. | 380/210 |
| 7,110,542 B1* | 9/2006 | Tripathy | ............. | 380/201 |
| 7,146,506 B1* | 12/2006 | Hannah et al. | ............. | 713/189 |
| 2002/0037081 A1* | 3/2002 | Rogoff et al. | ............. | 380/278 |
| 2002/0163598 A1* | 11/2002 | Pasqualino | ............. | 348/725 |

OTHER PUBLICATIONS

Digital Display Working Group, DVI Specification 1.0, 1999.*
"Upstream Link for High-bandwidth Digital Content Protection," Revision 1.00, pp. 1-38, 2000-2001 Intel Corporation.

* cited by examiner

*Primary Examiner*—Kambiz Zand
*Assistant Examiner*—Matthew Heneghan (57) ABSTRACT

A method and systems are provided for creating an authentication of secure communications between a software video driver and a video display. A video driver transmitting digital video data deemed high-bandwidth digital content, to a display, performs authentication to determine if a secure connection has been established with a display. The video driver and the display both generate encryption keys that are compared to ensure that the display used is authorized for secure communications. A single stream of video data is encrypted using the secret keys. A first encryption key encrypts even-numbered pixels in the single stream of video data. A second encryption key encrypts odd-numbered pixels in the single stream of video data. The stream is split into two streams of data, which are transmitted to a display. The display decrypts each of the streams of encrypted video data and merges them to re-create the original stream of video data. At a regular interval, the video driver securely queries the status of the video controller to verify that the connection between video controller and video display is still authorized and secure.

32 Claims, 7 Drawing Sheets

METHOD AND SYSTEM FOR DUAL LINK COMMUNICATIONS ENCRYPTION

FIELD OF THE INVENTION

The present invention relates generally to information handling systems and more particularly to encrypting communications within an information handling system.

BACKGROUND OF THE INVENTION

The entertainment industry is involved in a continual struggle to keep movies from being illegally copied. Unfortunately, the same technological advances that have made distributing high quality movies easier have made high quality illegal copies easier to produce. Of particular concern is the copying of high-bandwidth digital video content such as DVDs. Various methods have been employed to protect the content of DVDs from being copied illegally. One such method has been to equip DVD players with Macrovision, or a similar copy protection system. Common copy protection systems allow a media player to detect connections to multiple recording devices, and to scramble or otherwise alter the video data so that quality copies cannot be made. Because of the importance of preventing high quality copies from being made, a more secure form of copy protection, known as Content Scrambling System (CSS), was developed. Using CSS, the content of a DVD is encrypted, allowing the content of the DVD to be read only through the use of an encryption key stored on the DVD and a decryption key stored on the DVD player.

The use of encryption to protect DVDs from being illegally copied has been used much more frequently as DVD use has expanded. Many computers are being sold with built-in DVD drives and software players. While the content of the video and audio data in the DVD is encrypted, once the DVD player software has decoded the content, the content is decrypted and unsecured. Video controllers can be made with stored encryption keys that correspond to encryption keys on digital displays, allowing the content between the video controller and the display to be encrypted; however, installing a unique set of encryption keys during the production of the video controller hardware can be expensive. Furthermore, no insurance can be made of the security of data between the system's software and the video controller, within the information handling system.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE ILLUSTRATED EMBODIMENTS

At least one embodiment of the present invention provides a method for providing an encrypted link between a hardware controller and a peripheral device using dual link communications. The method includes receiving a single data stream. The method also includes encrypting a first portion of the single data stream with a first encryption key to generate a first encrypted stream. The method further includes encrypting a second portion of the single data stream with a second encryption key to generate a second encrypted stream. An advantage of at least one embodiment of the present invention is that communications between a software component in an information handling system and a hardware controller can be secured using encryption unique to a software component and peripheral device combination. Another advantage of at least one embodiment of the present invention is that the amount of hardware used to encrypt dual channels of video data related to dual link communications can be reduced.

Figure 1:
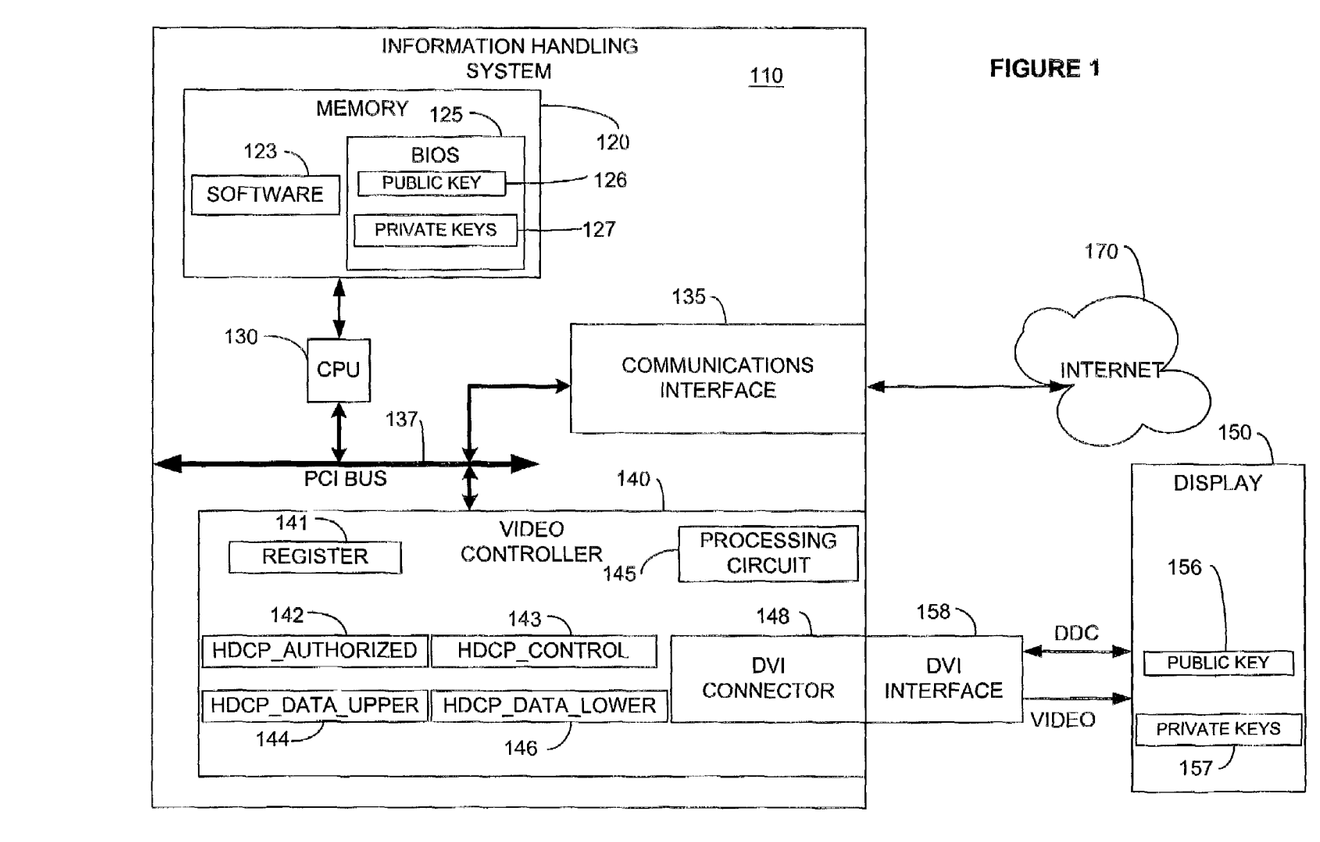
FIG. 1 is a block diagram illustrating an information handling system with an interfaced display, featuring key components according to at least one embodiment of the present invention.

Referring now to FIG. 1, a display is shown as part of an information handling system containing a software component, through a video controller, according to at least one embodiment of the present invention. Secure connections can be established between a software component, such as video driver 123, a video controller 140, and a display 150. Video driver 123 monitors and controls the flow of data, such as digital video disk (DVD) data to display 150 connected to video controller 140, dependent on whether the secure connection is maintained. In one embodiment of the present invention, display 150 is a digital video interface (DVI) compliant display which is connected to system 110, using a DVI interface 158 connected to a DVI connector 148. However, in at least one embodiment, display 150 can also be another type of display, a repeater with a plurality of displays connected to it or any other peripheral device used to transfer data.

When a DVD is being played through a DVD player connected to system 110, the content of the DVD can be read using a DVD drive and DVD player software (not shown). The DVD data is sent to a software component, such as video driver 123, run in memory 120 by a central processing unit (CPU) 130. Video driver 123 transmits a software public key 126 and a 64-bit pseudo random number, $A_N$, to the connected display 150. In one embodiment, display 150 uses multiple built-in decoders. A different pseudo random number is used for each decoder in display 150. In one embodiment, display 150 uses two decoders to access dual-link communications. Accordingly, video driver 123 would generate and transmit two pseudo random numbers for display 150, $A_{N1}$ and $A_{N2}$.

Software public key 126 can be stored as a part of memory 120 and video driver 123. Software public key 126 and any necessary private keys 127 can also be loaded from a basic input/output system (BIOS) chip 125. Alternatively, software public key 126 and any necessary private keys 127 can be downloaded from a network, such as the Internet 170, through a communications interface 135. $A_N$ is generated by video driver 123. The information handling system 110 may contain other devices such as an audio card (not shown), communications interface 135, etc. It will be appreciated that other internal bus types may be used, such as the Video Electronic Standards Association local bus (VLB), the industry standard architecture (ISA) bus, or the extended ISA (EISA) bus, without departing from the spirit or scope of the present invention.

Display 150 also transmits its public key, monitor public key 156, to video driver 123, through video controller 140. In one embodiment, video driver 123 checks monitor public key to determine if it is on a list of revoked keys. If the key has been revoked or it is not transmitted, a value can be written into register HDCP_AUTHORIZED 142 to indicate that display 150 is not authorized for secure communications. If the device connected to DVI connector 148 is a repeater (not shown) connected to a plurality of displays, the public key of each display is preferably monitored to ensure that they are all authorized for secure communications.

When video driver 123 receives monitor public key 156, it uses that key to select from private keys 127, as is described subsequently in FIG. 2. The chosen private keys are then added together. This summation generates a secret seed key, Km which can be used for authentication and encryption. Video driver 123 sends the value of Km to video controller 140, where it is stored in registers HDCP_DATA_UPPER 144 and HDCP_DATA_LOWER 146. A manipulation of Km with the pseudo random number AN, such as through an orthogonal transformation, is performed to generate another value, $R_0$. A separate $R_0$ value can be generated for each decoder within display 150. For example, a value $R_{01}$ can be generated using Km and $AN_1$. A value $R_{02}$ can be generated using Km and $AN_2$. In one embodiment, Km and AN are loaded into a least first shift register with a fixed known number of clock cycles. Select bits output from the LFSR are used along to generate $R_0$. $R_0$, or $R_{01}$ and $R_{02}$, can be stored in memory 120, or in a temporary register, such as register 141.

When display 150 receives software public key 126 and pseudo random number AN, it uses the software public key 150 to select from private keys 157. The chosen private keys are added together to generate a secret seed key, Km' which can be used for authentication. Manipulation performed on Km' with the received pseudo random number AN, as was discussed for generating $R_0$ from Km, is used to generate a value, $R_0'$. Display 150 transmits the value of $R_0'$, to video controller 140. For dual link communications, display 150 generates $R_{01}'$, using Km' and $AN_1$, and $R_{02}'$, using Km' and $AN_2$.

Video controller 140, under the control of processing circuit 145, can compare the stored $R_0$ and $R_0'$ values. If display 150 is an authorized display, Km and Km' should be the same value and $R_0$ and $R_0'$ should be equal. If the values are not equal, video controller 140 can terminate communications, continue trying to find an authorized connection, or simply notify video driver 123 of the unauthenticated condition. If $R_0$ and $R_0'$ are equal, display 150 is considered authenticated, and a value is written to register HDCP_CONTROL 143 to indicate that authentication is complete. Once the display is authenticated, video controller 140 is left to handle authentications of the secure connection with display 150. If display 150 is removed or another display is connected, it is the job of video controller 140 to notify video driver 123 so that software can update communications status accordingly, and take any necessary actions, such as terminating communications with display 150. Authentication, encryption, and other functions performed by video controller 140, can be performed using processing circuit 145. In one embodiment, processing circuit 145 is a hardware circuit, or collection of circuits, dedicated to encrypting and decrypting information, while in other embodiments, processing circuit 145 is a microcontroller or other processor that is used in conjunction with appropriate software to perform a wide variety of functions on video controller 140.

Communication along PCI bus 137, between video driver 123 and video controller 140 is preferably encrypted. In one embodiment, the value of Km (supplied by video driver 123) is combined with the value of monitor public key 156 by rearranging the bits of the combined value in a predefined ordering. The combination can be performed using a simple summation. The combination of the values of Km and monitor public key 156 can be used to generate an encryption key, herein referred to as the PCI key. Video controller 140 and video driver 123 can encode transmissions between each other on PCI bus 137 through a mathematical transformation, such as an orthogonal transform involving the PCI key. In one embodiment, an exclusive OR (XOR) calculation is performed between the data to be transmitted and the PCI key to encode transmissions. Since both video controller 140 and video driver 123 have knowledge of the PCI key, data between them can be encoded, transferred, and decoded.

Communication of non-video data between display 150 and video controller 140 is handled through DVI connector 148 and DVI interface 158 using an $I^2C$ compliant display data channel (DDC) line. It will be appreciated that other suitable communication protocols and corresponding hardware may be used according to the objectives of the present invention.

Since communication of control values between 140 and 150 are not encrypted in any form, an orthogonal transform can be used to encrypt communications between video driver 123 and video controller 140, using a dynamic encryption key. In at least one embodiment, the original key used for orthogonal encryption is the PCI key. If orthogonal encryption with a dynamic key is implemented, the PCI key can be altered periodically by applying a predetermined transform or a suitable mathematical algorithm to the value of the PCI key. For example, once data is decoded, a new encryption key can be generated using a combination of the value of Km with the decoded data. Using a dynamic encryption key, the communicating devices, such as video driver 123 and video controller 140, or display 150 and video controller 140, alter the encryption keys to provide added security. Alternatively, the function used for the orthogonal encryption can be dynamically altered to change the encryption scheme.

In one embodiment of the present invention, after an orthogonal encrypted link has been established on PCI bus 137, video driver 123 can send software public key 126 and an encrypted private decryption key, downloaded from the Internet 170, to video controller 140, through PCI bus 137. Monitor public key 156 can also be sent to video controller 140, through DVI connector 148, by display 150. After receiving all the necessary encryption and decryption keys, video controller 140 can use the encryption keys to implement public key encryption with display 150. Keys associated with video controller 140 can also be downloaded from a network, such as the Internet 170, to initiate public key encryption between video driver 123 and video controller 140.

Figure 1A:
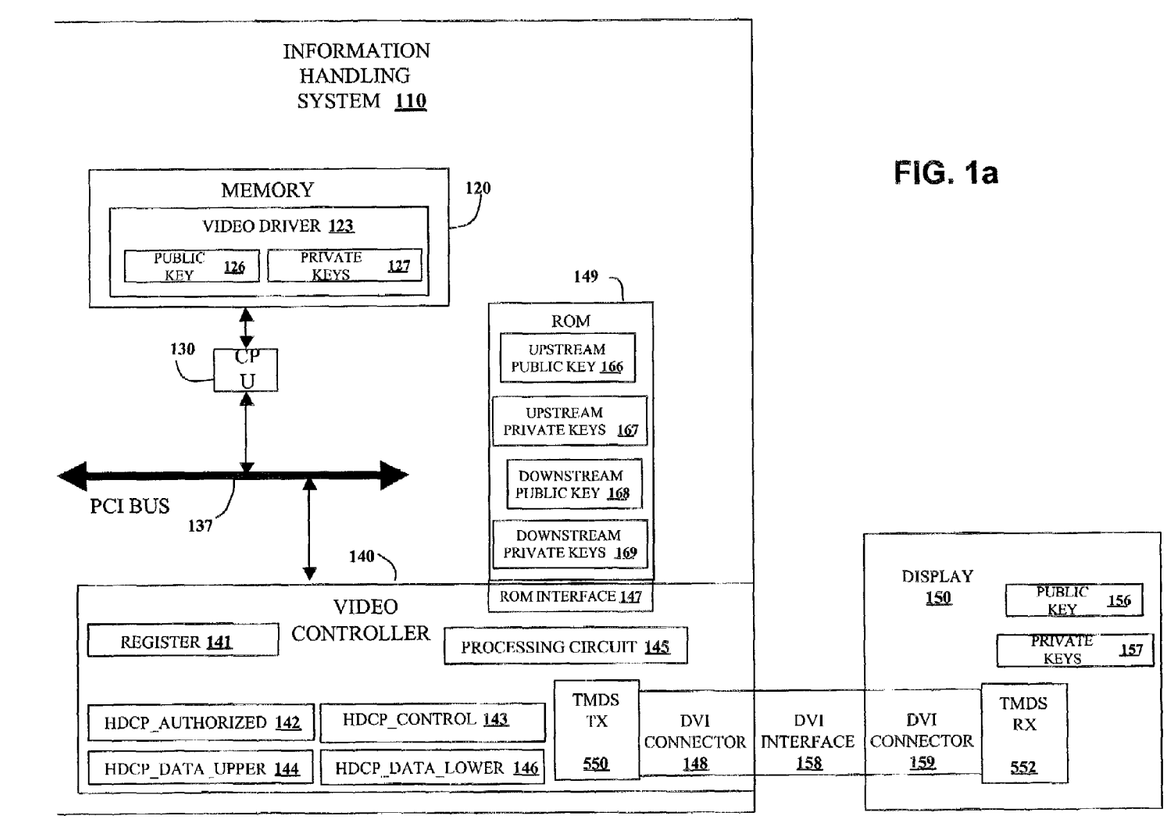
FIG. 1a is a block diagram illustrating an information handling system with a dual link interfaced display, featuring key components according to one embodiment of the present invention.

Referring now to FIG. 1a, a display is shown connected to a video controller capable of providing dual-link communications, according to one embodiment of the present invention. Video controller 140 is part of an information handling system 110 using a central processing unit (CPU) 130 running a software driver, such as video driver 123. A software application (not shown) generates video commands to be processed by video driver 123.

Video driver 123 processes the commands and prepares them to be sent to video controller 140. A software public key 126 and set of private keys 127 can be read for securing data sent between video controller 140 and video driver 123. Public key 126 and a pseudo random number (PRN) is sent to video controller 140 to allow video controller 140 to generate an authorization key to communicate with video driver 123 over peripheral component interconnect (PCI) bus 137.

Video controller 140 processes commands from video driver 123 and generates commands to display video on display 150 through a processing circuit 145. Video controller 140 receives the software public key 126 and the PRN generated by video driver 123. In one embodiment of the present invention, video controller 140 reads an upstream public key 166 and a set of upstream private keys 167 for communicating with video driver 123, from ROM module 149, through an integrated ROM interface 147. In accordance with one embodiment of the present invention, the keys stored on the ROM module 149 can be protected using a variety of protection schemes, including one described in a pending patent application, entitled "WRITE ONCE SYSTEM AND METHOD FOR FACILITATING DIGITAL ENCRYPTED TRANSMISSIONS", filed on Nov. 2, 2000. Video controller 140 uses the set of upstream private keys 167, the monitor public key 156, a PRN generated for display 150, the driver public key 126 and the PRN received from video driver 123, to generate an authorization key for communicating with video driver 123, as described in the Upstream Link for HDCP Revision 0.95 specification. Video controller 140 transmits the upstream public key 166, the monitor public key 156, the PRN generated for display 150, and a concatenated version of the authorization key generated by video controller 140, to video driver 123, over PCI bus 137. Registers 141, 142, 143, 144, and 146 can be used to store the data received and generated by video controller 140, as previously discussed for FIG. 1.

Video driver 123 receives the set of data transmitted by video controller 140 to generate its own version of the authorization key using the set of data and the driver private keys 127. Video driver 123 can compare the received concatenated version of the authorization key generated by video controller 140 with its own generated version of the authorization key to determine how to handle communications with video controller 140. In one embodiment, video driver 123 terminates communication with video controller 140 if the authorization key is incorrect.

Figure 5A:
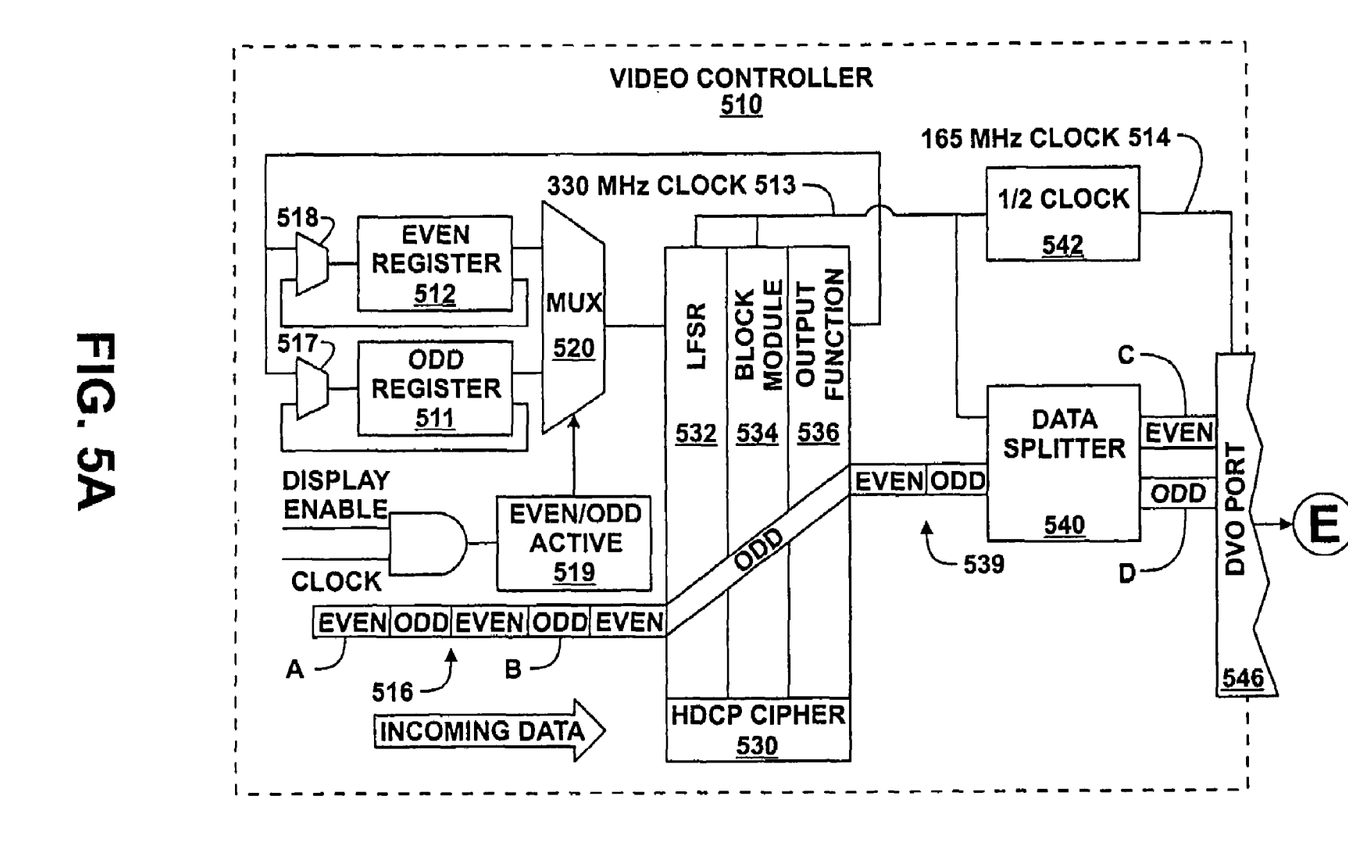
FIGS. 5A and 5B are block diagrams illustrating dual link communications between a video controller and a display, according to one embodiment of the present invention.
Figure 5B:
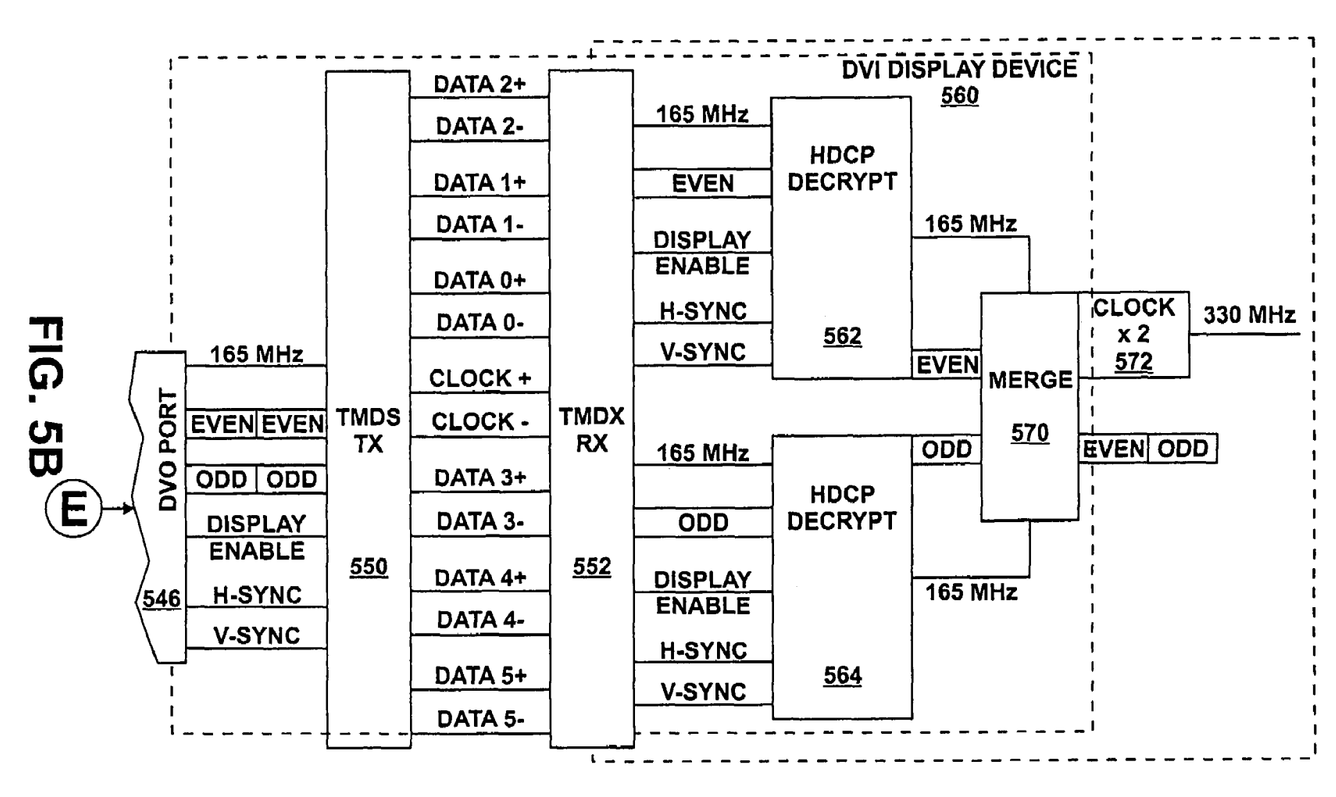

If authorization is successful, video driver 123 can receive encrypted data values and encrypted downstream authorized link status from video controller 140 which encrypts display data sent to display 150. Video controller 140 sends display data over a dual link, transferring two sets of encrypted video data to display 150. Video controller generates two PRN values. Video controller 140 uses each generated PRN number, along with the monitor public key 156 and a set of downstream private keys 169, to generate two distinct encryption keys. A first encryption key is applied to an even set of display data from a single data stream. A second encryption key is applied to an odd set of data from the single data stream. The set of encrypted data is sent out from video controller 140 over a DVI connector 148. A transmission-minimized differential signaling (TMDS) link is established by a TMDS transmitter 550 connected to DVI connector 148, using DVI interface 158. In one embodiment, establishing the TMDS link includes altering the format the encrypted data is sent at to the TMDS link format. The TMDS link data is received by display 150 through a display DVI connector 159, connected to DVI interface 158. A corresponding TMDS receiver 552 decodes the TMDS link data back into the set of encrypted data for display 150. Display 150 uses the two PRN values and downstream public key 168, sent by the hardware controller 140, to generate a key for decrypting the encrypted data links, as discussed further in FIG. 5. It should be noted that the single data stream may include multiple data sets combined from multiple sources to a single data stream.

Figure 2:
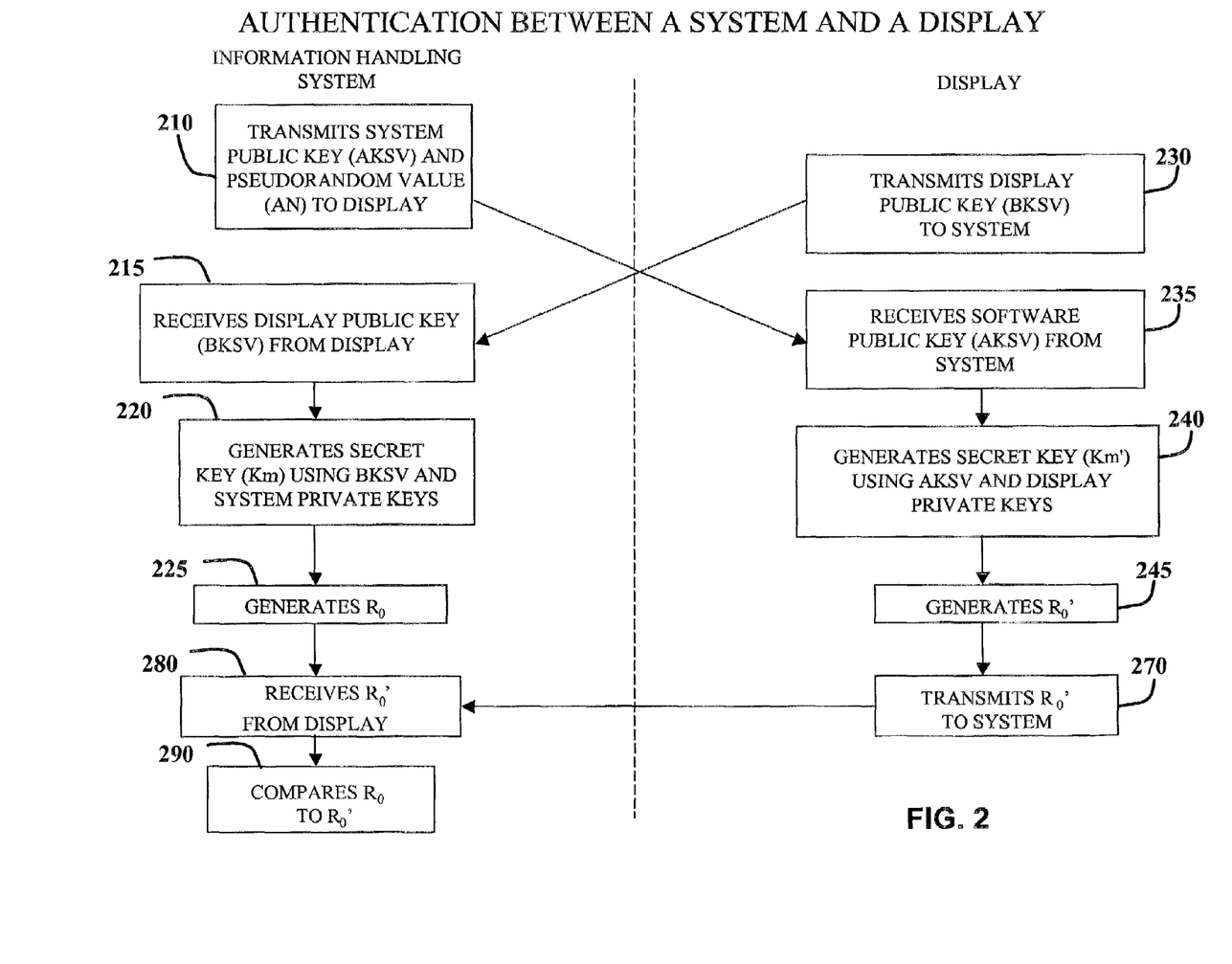
FIG. 2 is a chart illustrating a method of authenticating secure connections between an information handling system and a display, according to at least one embodiment of the present invention.

Referring now to FIG. 2, a diagram is shown illustrating the steps taken during the authentication of a display. When initiating communications with a display, a video driver can initiate and execute the steps described in FIG. 2 to insure that the display is authorized for secure communications.

In step 210 an information handling system transmits a public key and a pseudo random number (PRN), to a connected display. The public key will be referred to as key selector vector-A (AKSV) and the PRN will be referred to as $A_N$. In step 235, AKSV and $A_N$ is retrieved by the connected display. In step 240, the connected display uses the placement of binary 1's in AKSV to choose a subset of private keys from a stored collection of private keys located in the display. For example, if the location of 1's in AKSV are in the 0th, 4th, and 5th bit locations, as in the hexadecimal value 0x31 (0110001 in binary), the display would choose the 0th, 4th, and 5th private keys stored in an indexed array in the display. In one embodiment, AKSV is a 40-bit value with 20 1's and 20 0's, allowing the display to select 20, 56-bit private keys. It will be appreciated that the size of the keys used can be altered without departing from the scope of the invention. The selected private keys are preferably summed together, generating a secret seed key, Km'. In step 245, the Km' and $A_N$ values are manipulated to form another value $R_0$'. In step 270, $R_0$' is transmitted to the information handling system. $R_0$' can be encoded before being transmitted to the information handling system, such as through an orthogonal transform with the display's public key or the calculated seed key, Km'.

The connected display also transmits its public key, as in step 230. The display's public key will be referred to as the key selector vector-B (BKSV). In step 215, the information handling system retrieves BKSV. In step 220, the information handling system employs similar steps as the display's step 240 to calculate a secret seed key. The information handling system uses the connected display's public key, BKSV, to choose among its stored private keys. The information handling system chooses its private keys dependant on the locations of 1's in the binary value of BKSV. For example, if the location of 1's in BKSV are in the 0th, 2nd, and 4th bit locations, as in the hexadecimal value 0x15 (010101 in binary), the display would choose the 0th, 2nd, and 4th private keys stored in an indexed array in the information handling system. BKSV can be a 40-bit value with 20 1's and 20 0's, allowing the display to select 20 private keys. The selected private keys are preferably summed together, generating a secret seed key, Km. In step 225, the information handling system generates a value, $R_0$ through an orthogonal transformation of Km with $A_N$. In one embodiment of the present invention, the sets of encryption keys associated with the information handling system are downloaded from a network, such as the Internet.

In step 280, the information handling system receives $R_0$' from the display. $R_0$' is transmitted to the video controller 140. If $R_0$' is encrypted or encoded, the information handling system can follow any necessary steps to decrypt or decode $R_0$'. In step 290, the stored $R_0$ is compared to the received $R_0$', in the information handling system. If the connected display is an authorized display and the private keys and the public key are authorized, the calculated seed values, Km and Km' should be equal. For example, in the described embodiment, if the 0th, 2nd, and 4th private keys of the video driver were hexadecimal values 0x23, 0xA2, and 0x30, respectively, the value of Km would be 0x23 +0xA2+0x30, or 0xF5. If the display were an authorized display with 0th, 4th, and 5th private keys having hexadecimal values of 0x21, 0x31, and 0xA3, respectively, Km' would equal 0x21+0x30+0xA3, or 0xF5. Thus, if the connected display is authorized, the calculations of Km and Km' should result in equal values.

Once, the video controller compares the value of $R_0$' to $R_0$, video controller 140 (FIG. 1) provides video driver 123 (FIG. 1) with the results of the comparison. If Km and Km' are equal, then $R_0$ and $R_0$' should also be equal. If $R_0$ and Rot are not equal, the connected display is considered unauthorized and the video driver preferably does not send video data to the connected display; however, if $R_0$ and $R_0$' are equal, the video driver considers the display authorized and allows the video data to be transmitted to the display. Alternatively, if no data is received by the information handling system, as in steps 215 and 280, the connected device is automatically considered unauthorized. In a preferred embodiment, a software video driver performs most of the authorization in the information handling system. Once the display is considered authorized, the video driver turns over further authentication to a hardware video controller, allowing the software and other system resources to be freed for other tasks.

Figure 3:
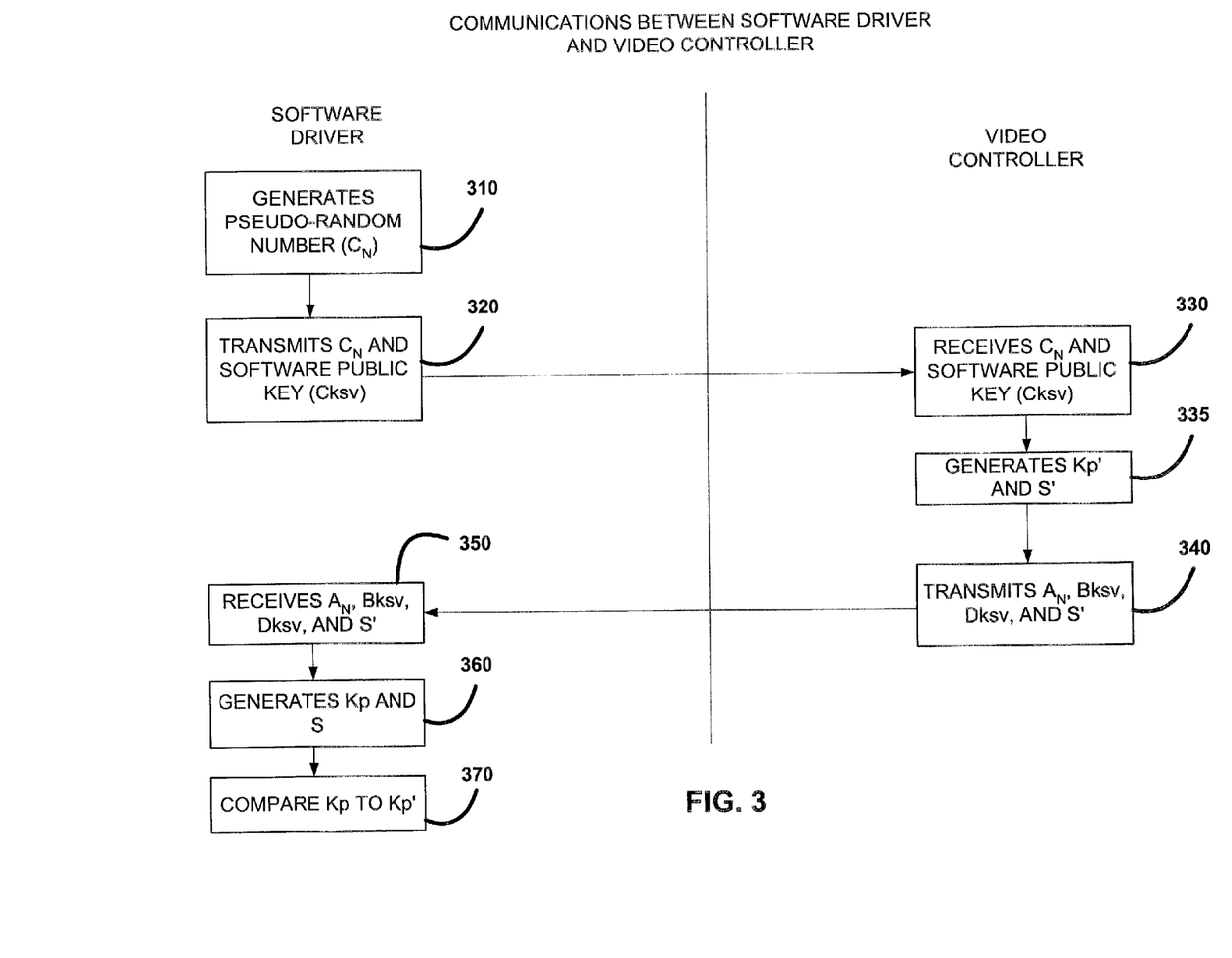
FIG. 3 is chart illustrating a method to secure communications between a software video driver and a video controller, according to at least one embodiment of the present invention.

Referring now to FIG. 3, a diagram of the steps used to perform secured connections between a software video driver and a hardware video controller are shown, according to one embodiment of the present invention. Steps are taken to generate a key for authenticating the video driver and the video controller.

In step 310, the video driver generates a pseudo random number, $C_N$. In one embodiment, $C_N$ is a 64-bit value. In step 320, $C_N$, the video driver's public key, key selection vector-C (CKSV), and status data, related to the video driver, are sent to the video controller. In one embodiment, communication between the software driver and the video controller is handled over a peripheral component interconnect (PCI) bus within an information handling system.

In step 330, the video controller retrieves $C_N$, the status data, and CKSV. The video controller also receives a public key associated with a display device, key selection vector-B (BKSV), and generates a PRN for the display, $A_N$. In step 335, the video controller uses CKSV, BKSV, $C_N$, $A_N$, status data regarding the authorization and type of downstream link between the information handling system and display, and a collection of private keys associated with the video controller to generate a key, herein referred to as Kp', according to the methods described in the Upstream Link for HDCP specification. Kp' is concatenated, using the status data pertaining to the downstream link, to generate S'. In step 340, the video controller transmits $A_N$, BKSV, S', and a public key associated with the video controller, key selection vector-D (DKSV), to the video driver. It should be noted that if no display is connected to the video controller, the values of BKSV and $A_N$ can be determined arbitrarily for the calculations of Kp'. If dual link communications are being performed between the video controller and a connected display, unique PRNs are generated for each decryption component available in the display. In the case of multiple PRNs for the display, a primary PRN can be designated as $A_N$, for communication with the video driver.

In step 350, the video driver receives $A_N$, BKSV, S', and DKSV. In step 360, the values of BKSV, DKSV, $A_N$, along with the set of private keys associated with the video driver, are used to generate a key, Kp. By concatenating the value of Kp with the status data of the video driver, a value S can be generated. The calculations for generating Kp and S are similar to those described in the Upstream Link for HDCP specification. In step 370, the value of Kp can be compared to Kp', through the comparison of S with S'. If the values are equal, the video controller and the video driver can be considered successfully authenticated indicating that the status data is valid. If the values differ, video controller can decide to terminate communications with the video controller until it passes the authentication. In one embodiment, the values of Kp and Kp' are used for encrypting and validating the authenticity of communications over the PCI bus. In a specific embodiment, the status data of the video controller is checked at least every two seconds by the video driver to assure secure communication is maintained.

Figure 4:
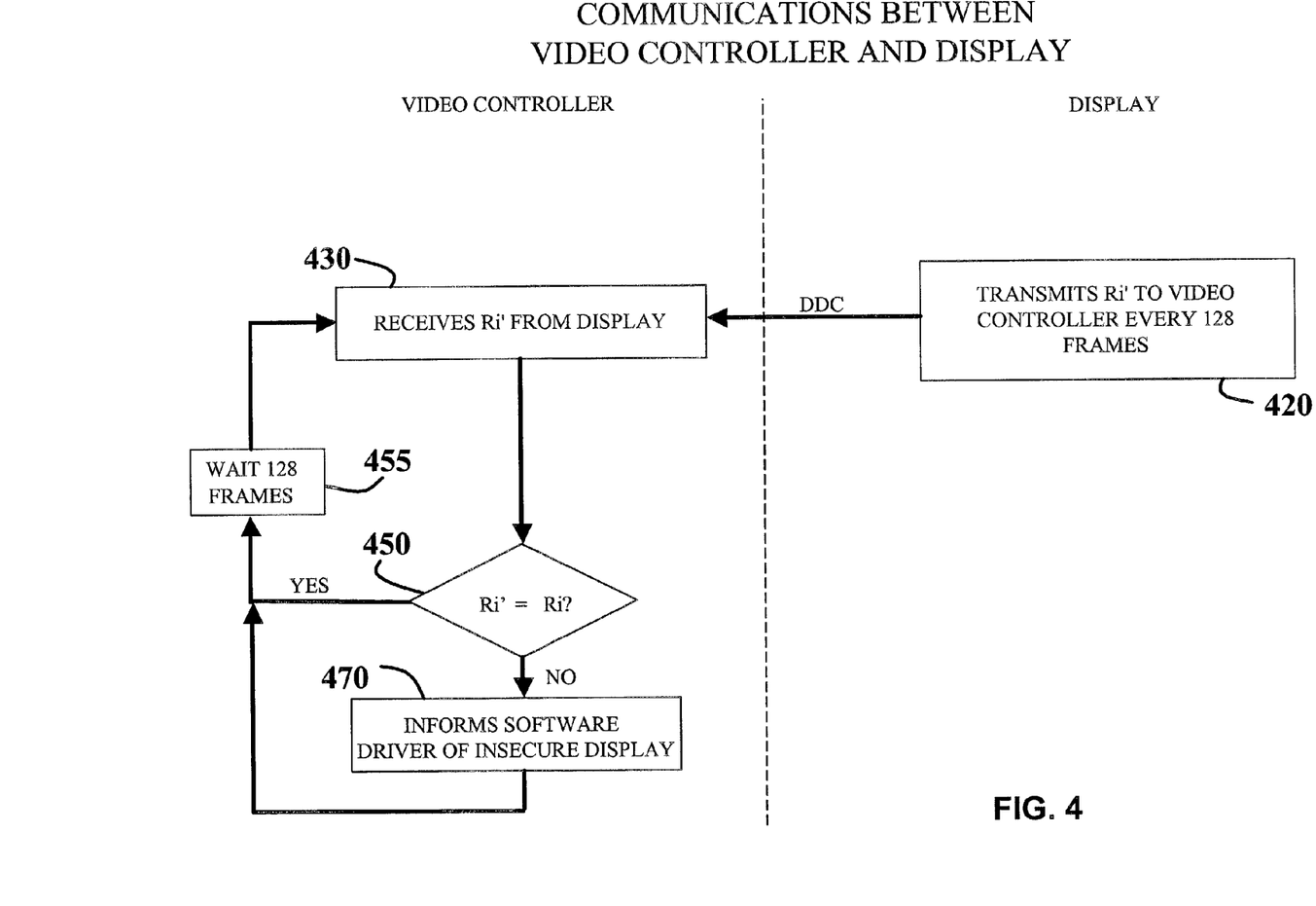
FIG. 4 is a flow chart illustrating a method of authenticating secure communications between a video controller and a display.

Referring now to FIG. 4, a flow chart illustrating authentication between a video controller and a display are shown, according to one embodiment of the present invention. Communication between the video controller and a display is performed to continually verify the security of authenticated devices connected to the video controller.

In step 420, the display transmits $R_i$' to the video controller. In one embodiment, the display transmits the $R_i$' once for every 128 frames displayed. The transmission is preferably sent over the digital data channel (DDC) line on the video controller's digital video interface (DVI) connector, using I$^2$C protocols.

In step 430, the video controller receives $R_i$' through the DDC line. In step 450, the video controller compares the received $R_i$' to the stored $R_i$. In one embodiment, due to a wait in step 455, $R_i$ is calculated from the cipher value at the end of every $128^{th}$ frame and originating from the seed key (Km), sent by the video driver. It will be appreciated that step 450 can be performed by the video driver in place of the video controller. If $R_i$' is not equal to $R_i$, the display is either not an authorized display, the connection to the display has been terminated, or another display has been connected. In step 470, if $R_i$' is not equal to $R_i$, the video driver is informed of the insecure connection. The video controller can then send the video data to the display unencrypted, allowing it to be displayed, or the video driver can disable the video transmission to the video controller, only allowing secured displays to be used. Devices other than displays can be connected to the video controller. Alternatively, a repeater can be connected to the video controller. A repeater can be used to transmit video to a plurality of displays. If a repeater is used, the repeater preferably transmits key selector vectors from each of the plurality of displays to the video controller for authentication.

Referring now to FIGS. 5A and 5B, a system for handling encrypted dual link DVI video data is shown, according to one embodiment of the present invention. A video controller 510, communicating with a digital video interface (DVI) display 560, generally queries display 560 to determine the capabilities of display 560. The capabilities of display 560 can be used to determine the amount of data sent by video controller 510.

Displays generally work by activating screen pixels with an electron gun. The electron gun scans across the screen activating certain color-specific pixels dependant on the image data received. Once a horizontal line has been displayed, display 560 receives a horizontal sync, instructing the electron gun to retrace back to the left of the screen. Once the scan has completed an entire frame, display 560 receives a vertical sync signal from video display 510 that instructs the electron gun to return to the top of the screen. During the time in which the electron gun retraces, no screen information is displayed. This retrace time in which the screen is blank is referred to as the blanking interval. Since displays can't display data during the blanking interval, the amount of time taken by the blanking interval restrains the number of pixels a display can process per frame.

Accordingly, video controller 510 can send digital video data over either a single or a dual differential signaling link. Video controller 510 can transmit two sets of video data. In at least one embodiment, transmission over a single link is limited to a maximum of 165 MHz. If a display is capable of handling video data at display modes above 165 MHz, referred to as large-pixel format video, video controller 510 can activate the second link, allowing twice as much video data to be transmitted over the data lines between video controller 510 and display 560. In one embodiment, dual link DVI communications allows greater than 5 million pixels to be displayed per frame. Utilizing both links allows up to 330 MHz to be effectively transmitted to display 560. It should be noted that the effective rate at which a display can accept data will generally be divided evenly between the data links. For example, if the display can accept data at 300 MHz, each link is run at 150 MHz. Generally, to support encrypted dual link DVI communications, separate hardware components are needed in the video controller 510 to process video data for both data links separately. However, by handling the data as a single data stream, a single set of components is used to handle operations on the single data stream.

Video controller 510 is used to transmit dual link DVI data to a supporting display 560. A single data stream 516, containing interweaved even pixel data set A and odd pixel data set B, intended for display 560 is processed by video controller 510. Separate encryption keys are generated for each of the data sets, even pixel data set A and odd pixel data set B. An even register 512 contains data to be used in encrypting even pixel data set A and odd register 511 contains data to be used in encrypting odd pixel data set B. The data from even register 512 and the data from odd register 511 are combined using a multiplexing component 520. In one embodiment of the present invention, multiplexing component 520 is a logical multiplexor. Multiplexing component 520 can also be provided through switching circuitry. Pixel data, as described herein, may refer to several bits of data. For example, in one embodiment, each set of pixel data includes 24 bits of data, 8 bits for each red, green, and blue component of the pixel. In one embodiment, the single data stream is generated by combining data from multiple sources, such as multiple video processing components. For example, a first video processing component can generate even pixel data set A and a separate video processing component can generate odd pixel data set B. In another embodiment, the data stream is generated by a single component.

The combined data from multiplexing component 520 and the single data stream 516 is provided to module components 532, 534, and 536 of a high-bandwidth digital content protection (HDCP) cipher component 530 in video controller 510. A clock 513 is used to clock the data provided to the LFSR module 532 and block module 534. In one embodiment, a combination of a display enable signal and a clock signal are used to provide a trigger signal 519 which can be used to trigger whether the even or odd pixel data is active. LFSR module 532 combines the data received from multiplexing component 520. In one embodiment, pseudo random numbers (PRN) generated by a free-running LFSR module 532 in video controller 510, are used to generate encryption keys for single data stream 516. The keys are generated using a public encryption key provided by the display 560, a set of private keys provided with the video controller 510, and the PRN values, one for each of the plurality of links, in the case of this dual-link situation two. A distinct key is generated for each link within the DVI display device. For the dual link communications described herein, two distinct encryption keys are generated. While the same public keys and private keys are used to generate both keys, different PRN values are used to generate the two distinct keys. An even key is generated to be associated with the even pixel data set A and an odd key is generated to be associated with the odd pixel data set B. The encryption key information is presented to LFSR module 532 and block module 534.

The combined output from LFSR module 532 is presented to block module 534. The single data stream 516 is then encrypted by output function 536. Output function 536 encrypts portions of the single data stream 516, allowing the even pixel data set A to be encrypted using the even encryption key and the odd pixel data set B to be encrypted using the odd encryption key. During an active signal from trigger 519, where display enable is active, LFSR module 532 and block module 534 are clocked once for every pixel, odd or even. During a horizontal blanking interval, block module 534 is clocked 112 times to allow for encryption re-keying for each link (56 times for the even link and 56 times for the odd link). During a vertical blanking interval, block module 534 is clocked a total of 208 times, 48 times for each of two links to load new information into block module 534 and 56 times for each of two links to reload block module 534.

In one embodiment of the present invention, the encryption and decryption algorithms used are re-keyed. The re-keying process allows for new and changing encryption keys to be used in encrypting and decrypting the data sent between video controller 510 and display 560. The output from HDCP cipher component 530 is run through multiplexing components 517 and 518. Multiplexing component 517 selects the output from HDCP cipher component 530 when trigger signal 519 indicates that the current pixel is an odd pixel and otherwise selects the existing output value from odd register 511 to provide new data to odd register 511. Similarly, multiplexing component 518 selects the output from HDCP cipher component 530 when trigger signal 519 indicates that the current pixel is an even pixel and otherwise selects the existing output value from even register 512 to provide new data for even register 512. The new data presented to registers 511 and 512 are used to re-key the encryption algorithm performed in HDCP cipher component 530 and HDCP decryption components 562 and 564.

In one embodiment, re-keying is performed during a horizontal blanking interval, initiated by a horizontal sync signal. As previously discussed, block module 534 is clocked 112 times to handle both keys, 56 times for the even pixel data and 56 times for the odd pixel data. Re-keying is also performed during the vertical blanking interval. A re-key enable signal can be provided to control the re-keying. For every bit in which the re-key enable signal is active, re-keying is performed using a bit from the output of LFSR module 532 in lieu of the corresponding bit from the block module register. If re-key enable is not active, the re-key information is taken from the outputs of the even or odd registers 511 and 512 dependent upon whether the current pixel is an even pixel or an odd pixel. In one embodiment, after 128 frames have been sent to display 560, video controller 510 performs authorization checks to determine if the encryption information stored in display 560 matches the encryption information stored by video controller 510, as described in FIG. 4. An authorization check is performed for each link or HDCP decryption component display 560, such as HDCP decryption components 562 and 564.

The encrypted data stream 539 is sent to a de-multiplexing component 540. De-multiplexing component 540 uses clock 513 to selectively route each bit to a separate output. In one embodiment of the present invention, the encrypted data stream 539 is split into an even pixel data stream C, containing the bits of even pixels from encrypted data stream 539, and an odd pixel data stream D, containing the bits of odd pixels from encrypted data stream 539. A clock divider 542 is used to provide a half speed clock 514, providing a signal running at half the rate as clock 513. The clock splitter can be a phase locked loop (PLL) synchronized to clock 513 or a set of logic designed to halve the rate of clock 513. Half speed clock 514 is used to provide a reference clock for clocking even pixel data stream C and odd pixel data stream D.

The sets of data streams C and D and half speed clock 514 are output from video controller 510 using a digital video output (DVO) port 546. DVO port 546 also provides a display enable signal, indicating when the display should read video information, a horizontal sync signal, indicating when display 560 should retrace horizontally, and a DVI control 3 signal, whose value is identical to the vertical sync when HDCP encryption is enabled, indicating that the next frame will contain encrypted data, and a vertical sync indicating when display 560 should retrace vertically. Every pixel of video data provided by DVO port 546 contains 24 bits. Twelve bits are clocked for each of the odd and even pixel data sets for every transition edge of half speed clock 514. Accordingly, for every full clock period of half speed clock 514, a set of 24 bits is clocked for each pixel data set. Eight bits are used for each primary color, red, green, and blue. Even pixel data stream and odd pixel data stream each provide information for a separate pixel in 24 bits. In one embodiment, every set of data sent over DVO port 546 contains 24 bits associated with even pixel data stream C, 24 bits associated with odd pixel data stream D, a display enable signal, a horizontal sync signal, a vertical sync signal, and a DVI control 3 HDCP encryption enabled signal.

In one embodiment, a transmission-minimized differential signaling (TMDS) link is used for sending video information between video controller 510 and display 560. A TMDS transmitter 550 implements advanced encoding algorithms to convert each eight bits of data from a single data stream to a 10 bit transmission minimized, DC balanced character. A TMDS receiver 552 can perform similar decoding algorithms to recreate the transmitted data streams. The TMDS devices 550 and 552 can utilize two separate links, one for even pixel data stream C and one for odd pixel data stream D. In one embodiment of the present invention, TMDS receiver 552 monitors the capabilities of a connected display, such as display 560, to determine whether or not to activate both sets of transmission links between TMDS transmitter 550 and TMDS receiver 552. TMDS receiver 552 can provide two sets of the decoded video data to display 560. A first set of decoded data, including the data from even pixel data stream C, half speed clock 514, a display enable signal, a vertical sync signal, a horizontal sync signal, and a DVI control 3 encryption enabled signal is provided to a first HDCP decryption component 562. A second set of decoded data, including the data from odd pixel data stream D, half speed clock 514, the display enable signal, the vertical sync signal, the horizontal sync signal, and the DVI control 3 encryption enabled signal is provided to a second HDCP decryption component 564.

As previously discussed, a public key associated with video controller 510 is provided to display 560 along with two distinct PRN values. The public key is combined with a set of private keys stored in display 560 to generate a seed key Km'. The seed key is combined in each HDCP decryption component with a distinct PRN. For example, a first PRN value is combined with Km' and manipulated in HDCP decryption component 562 to generate a first authorization value herein referred to as $R_{01}$'. A second PRN value is combined with Km' and manipulated to generate a second authorization value, herein referred to as $R_{02}$'. $R_{01}$' and $R_{02}$' are transmitted to video controller 510, capable of generating similar values, $R_{01}$ and $R_{02}$, respectively using identical PRN values, a public key associated with display 560, and a set of private keys associated with video controller 510. Video controller 510 can perform an authorization check by comparing $R_{01}$ and $R_{02}$ with $R_{01}$' and $R_{02}$', respectively.

The first HDCP component 562 decrypts the data from even pixel data stream C using a decryption key related to the encryption information used for the even pixel data set in HDCP cipher component 530. The data in first HDCP component 562 is clocked using half speed clock 514. The decrypted data is provided to a multiplexing component 570. Second HDCP component 564 decrypts the data from odd pixel data stream D using a decryption key related to the encryption information used for the odd pixel data set in HDCP cipher component 530. The data in second HDCP component 564 is clocked using half speed clock 514. Decrypted data from second HDCP decryption component 564 is provided to multiplexing component 570.

Multiplexing component 570 merges the data provided from first HDCP decryption component 562 with the data provided from second HDCP decryption component 564 to generate a merged data stream. In one embodiment of the present invention, the decrypted data from first HDCP decryption component 562 is used for the even pixels in the merged data stream and the decrypted data from the second HDCP decryption component 564 is used for odd pixels in the merged data stream. A clock doubler 572 is used to double the clock rate provided by half speed clock 514. The clock rate provided by clock doubler 572 provides the clock signal for clocking the data through and out of multiplexing component 570. Multiplexing component 570 may be incorporated with a multiplexor or other switching circuitry and components. Clock doubler 572 can be incorporated using a PLL or similar circuitry designed to synchronize to the signal from half speed clock 514 and provide twice the clock rate output. The output clock from clock doubler 572 can be used to clock the merged data stream through DVI circuitry in display 560. In one embodiment of the present invention, clock 513 and the output signal from clock doubler 572, both have a clock rate of 330 MHz, while the half speed clock 514 provides a 165 MHz signal.

As previously discussed, re-keying can be performed during the horizontal blanking interval, initiated by the horizontal sync signal. Re-keying can also be performed during a vertical blanking interval, triggered by the vertical sync signal. After 128 frames have been sent to display 560, video controller 510 performs an authorization check to determine if $R_{i0}$' and $R_{i1}$', stored in display 560 matches the values of $R_{i0}$ and $R_{i1}$, stored in video controller 510, as previously described.

The preceding descriptions have shown embodiments of the present invention used to authenticate secure communications between an information handling system with a video controller and a single connected display. Authentication described herein can be performed with other types of connected devices. The present invention can also be performed to securely communicate with a plurality of connected displays, such as through an authorized video repeater with a plurality of connected devices. An embodiment of the present invention can also be implemented in systems other than computers, and can be used to control the transmission of data other than video data. For example, at least one embodiment of the present invention could be implemented in a compact disc (CD) player, or in other devices that might benefit from encrypted information transfer. It should now be appreciated by those skilled in the art that the present invention has the advantage that increased security can be achieved by providing for authentication between a software driver and a hardware controller. Another advantage, of at least one embodiment of the present invention, is that the amount of hardware used to encrypt dual channels of video data related to dual link communications can be reduced.

In the preceding detailed description of the preferred embodiments, reference has been made to the accompanying drawings, which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A system comprising:
a data processor;
a memory coupled to the data processor,
the memory for storing code for:
establishing a set of encrypted links between a peripheral device and a software component, wherein establishing a first encrypted link of the set of encrypted links includes generating a first encryption key associated with a first port of encrypted data and establishing a second encrypted link of the set of encrypted links includes generating a second encryption key associated with a second port of encrypted data;
a hardware controller for outputting the first and the second encrypted links, wherein the hardware controller includes:
a first register for storing information associated with the first encryption key;
a second register for storing information associated with the second encryption key;
a cipher component for:
receiving a single digital data stream;
applying the first encryption key to a first portion of the data stream; and
applying the second encryption key to a second portion of the data stream; and
a de-multiplexing component for splitting the single data stream into multiple data streams.

2. The system as in claim 1, further comprising:
a multiplexing component capable of:
combining the information stored in the first register with the information stored in the second register; and
providing the combined information to the cipher component;
a clock capable of clocking data bits from the single data stream; and
a half speed clock capable of clocking data in the multiple data streams.

3. The system as in claim 1, wherein the cipher component applies the first encryption key to even bits in the single data stream and applies the second encryption key to odd bits in the single data stream.

4. The system as in claim 1, further comprising a peripheral device comprising:
an interface for receiving the multiple data streams;
a first decryption component for decrypting a first data stream of the multiple data streams to generate a first decrypted data stream;
a second decryption component for decrypting a second data stream of the multiple data streams to generate a second decrypted data stream; and
a multiplexing component for combining the first and the second decrypted data streams to generate a single decrypted data stream.

5. The system as in claim 4, wherein the interface is further for receiving a horizontal sync signal.

6. The system as in claim 5, wherein the first and second encryption keys are regenerated according to the horizontal sync signal.

7. The system as in claim 1, wherein the hardware controller is a video controller.

8. The system as in claim 7, wherein the multiple data streams are received from a dual link digital video output (DVO) port on the video controller that is capable of outputting two channels of data related to video.

9. The system as in claim 8, wherein the multiple data streams are transmitted using a transmission-minimized differential signaling (TMDS) transmitter.

10. The system as in claim 9, further including a TMDS receiver capable of receiving the transmitted data associated with the multiple data streams and outputting the multiple data streams.

11. The system as in claim 1, wherein the multiple data streams are received from a dual link internal TMDS transmitter and transmitted using a video interface capable of outputting two channels of pixel data related to video.

12. The system as in claim 1, wherein the first portion of the digital data stream is associated with even pixels and the second portion of the data stream is associated with odd pixels.

13. A system comprising:
an interface for receiving a first link of encrypted data and a second link of encrypted data from a hardware controller;
a first decryption component for decrypting the first link of encrypted data using a first encryption key to generate a first portion of a single received digital data stream;
a second decryption component for decrypting the second link of encrypted data using a second encryption key to generate a second portion of the received digital data stream; and
a multiplexing component for combining the first and the second portions of the received data streams to form a single received digital data stream.

14. The system as in claim 13, further including:
- a clock for clocking the single received data stream at twice the speed of the first and second links of encrypted data; and
- a single processing component for processing the data associated with the first and the second links of encrypted data.

15. The system as in claim 13, wherein the interface is further for receiving a horizontal sync signal.

16. The system as in claim 15, wherein the first and the second encryption keys are regenerated according to the horizontal sync signal.

17. The system as in claim 13, wherein the multiplexing component assigns bits of data in the first portion of the received data stream to even pixels in the received data stream and assigns bits of data in the second portion of the received data stream to odd pixels in the received data stream.

18. The system as in claim 13, wherein the hardware controller is a video controller.

19. The system as in claim 18, wherein the first and the second link of encrypted data are transmitted from a dual link digital video output (DVO) port on the video controller that is capable of outputting two links of data related to video.

20. The system as in claim 13, wherein the first portion of the received digital data stream is associated with even pixels and the second portion of the received digital data stream is associated with odd pixels.

21. A method comprising:
- receiving a data stream comprising display data representative of video to be displayed; encrypting a first portion of the display data using a first encryption key to generate a first encrypted stream;
- encrypting a second portion of the display data using a second encryption key to generate a second encrypted stream;
- transmitting the first encrypted stream for reception by a peripheral device via a first link of a video output port; and
- transmitting the second encrypted stream for reception by the peripheral device via a second link of the video output port that is separate from the first link of the video output port.

22. The method as in claim 21, wherein encrypting the first portion of the display data and encrypting the second portion of the display data is performed by the same encryption component.

23. The method as in claim 21, further comprising:
- generating the first encryption key using a public encryption key associated with the peripheral device, a private key associated with the peripheral device, and a first pseudo random number; and
- generating the second encryption key using the public encryption key associated with the peripheral device, the private key associated with the peripheral device, and a second pseudo random number.

24. The method as in claim 21, further comprising:
- receiving the first encrypted stream and the second encrypted streams at the peripheral device;
- decrypting the first encrypted stream to generate a first portion of a received display data;
- decrypting the second encrypted stream to generate a second portion of the received display data; and
- combining the first portion of the received data stream with the second portion of the received display data to generate a received video stream.

25. The method as in claim 24, further comprising: storing the received video stream at the peripheral device.

26. The method as in claim 24, further comprising:
- displaying video represented by the received video stream at the peripheral device.

27. The method as in claim 21, further comprising:
- receiving a horizontal sync signal at the peripheral device via the video output port; and
- regenerating at least one of the first encryption key and the second encryption key at the
  - peripheral device in response to the horizontal sync signal.

28. The method as in claim 21, wherein the first portion of the display data comprises data representative of even pixels of the display data and the second portion of the display data comprises data representative of odd pixels of the display data.

29. The method as in claim 21, wherein:
- encrypting the first portion of the display data comprises encrypting even bits of the display data with the first encryption key; and
- encrypting the second portion of the display data comprises encrypting odd bits of the display data with the second encryption key.

30. The method as in claim 21, wherein the peripheral device comprises a display device.

31. The method as in claim 21, wherein the video output port comprises a DVI-compatible video output port.

32. The method as in claim 21, wherein the first link comprises a first video data link of the DVI-compatible video output port and the second link comprises a second video data link of the DVI-compatible video output port.

\* \* \* \* \*